Nov. 13, 1956  C. LINHARDT, JR  2,770,436
OUTLET BOX SUPPORT
Filed Dec. 6, 1950
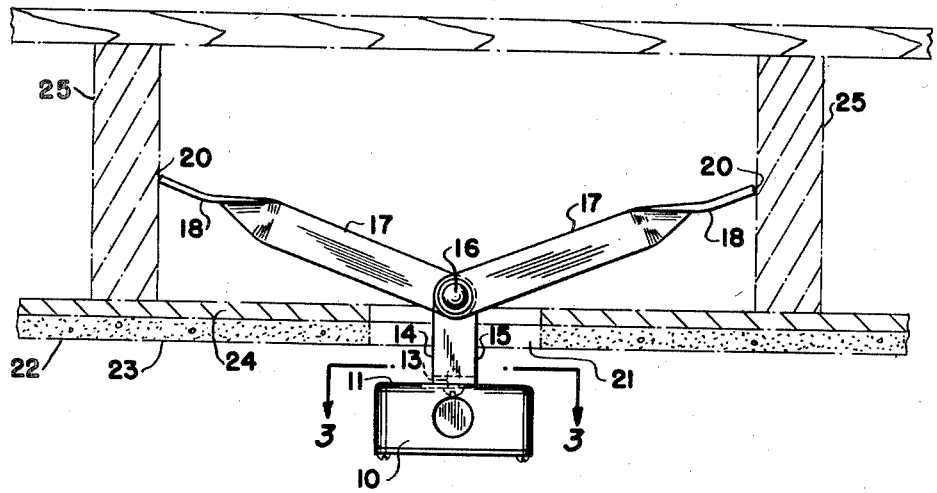
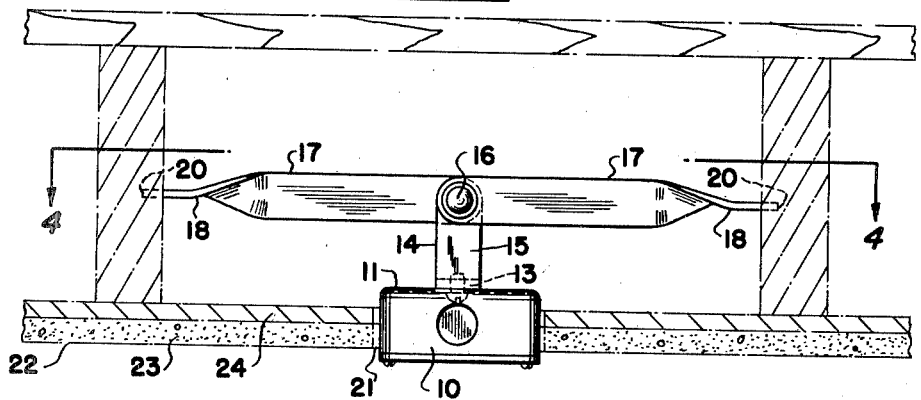
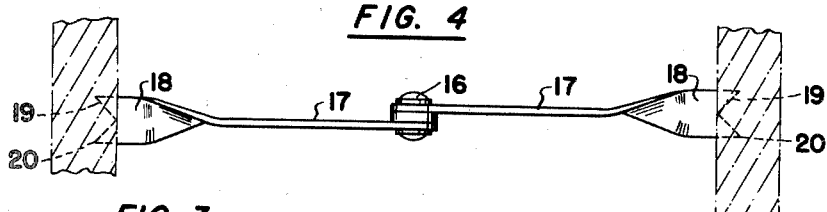
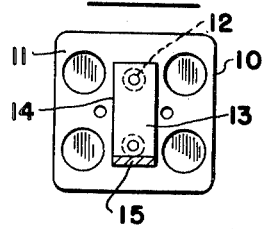
INVENTOR.
CHARLES LINHARDT, JR.
BY

United States Patent Office 2,770,436
Patented Nov. 13, 1956

2,770,436
OUTLET BOX SUPPORT

Charles Linhardt, Jr., Baltimore, Md.; Mercantile Trust Company of Baltimore, executor of said Charles Linhardt, Jr., deceased, assignor to The Automatic Lite Company, Baltimore, Md., a corporation of Maryland Application December 6, 1950, Serial No. 199,435

1 Claim. (Cl. 248—57)

The present invention relates to outlet boxes for electrical conduits and having means carried thereby for securely fastening and locking the same in an opening in a wall of wood, plaster or the like.

The present day method of securing outlet boxes by screws, has not proven satisfactory for the reason that the ears through which screws are inserted afford only a limited area for the screws to fasten to a wall, and for this reason, plaster or compo board breaks around the opening through which an outlet box is inserted, leaving the screws loose as well as the box. The ears on the box are usually right angle brackets having apertures, one angle being secured to the box by screws, the other angle engaging a wall or the like and being secured by screws. This assembly is costly as it consumes the time of an electrician in adjusting the angle brackets for proper depth into the wall and securing the box by screws.

It is an object of the present invention to provide an outlet box that may be installed in a wall with a minimum of effort.

Another object of the present invention is the provision of a box that does not have brackets that have to be secured to a plaster wall or the like by screws.

A still further object of the present invention is the provision of means associated with an outlet box for securely holding the outlet box in a hole in a wall.

A still further object of the present invention is the provision of means associated with an outlet box for adjustably securing the outlet box in walls of varying thicknesses, A still further object of the present invention is the provision of means associated with an outlet box that permits the positioning of the box in an opening by simply exerting a pressure.

A still further object of the present invention is the provision of means associated with an outlet box having means for locking and rigidly holding the outlet box in an opening in a wall.

Other objects and advantages of the present invention will be more fully understood from the following description and claim when the same are read in connection with the drawings accompanying and forming a part of this specification, similar numerals of reference designating like parts in all the views.

Figure 1 is a top plan view of the present device and illustrating the position of the elements prior to fixedly securing them in locked position, the walls and studding being shown in dotted lines.

Figure 2 is a view similar to Figure 1 and illustrating the outlet box rigidly secured in an opening in a wall.

Figure 3 is a sectional view taken on line 3—3 of Figure 1, and

Figure 4 is a sectional view taken on line 4—4 of Figure 2 and illustrating the means in dotted lines on the ends of the arms for engaging studding and rigidly holding an outlet box in the desired position.

In the drawings the numeral 10 represents an outlet box having the usual cover plate. To the rear face 11 of the outlet box there is secured by bolts 12 or other suitable means, one arm 13 of an angle bracket 14. The arm 15 of the bracket 14 is provided with an aperture that receives a rivet or bolt 16 that engages apertures in one end of the arms 17, thus pivotally securing the arms to the arm element 15.

Each of the arms 17 are provided with a half twist portion 18, the end edge of the half twist portion having a V-shaped cut out portion 19 forming a pronged end 20.

In actual use of the present device, the arms 17 are inserted through an opening 21 in a wall 22, the wall comprising plaster 23 and lath 24, and as illustrated in Figure 1, the arms and box assume the position shown, the pointed ends 20 of the half-twist portion 18 of the arms 17 engaging the studding 25. When the arms and box are approximately positioned the proper distance, pressure is next exerted against the box 10, and during pressure the pointed ends 20 imbed themselves in the studding 25 as shown by the dotted lines in Figures 2 and 4, the pressure being continued until the arms are in a horizontal position with each other, as shown in Figure 2 of the drawing, thus rigidly, yet detachably securing the outlet box in position in the opening 21, the front face of the box may be made flush with the face of the plaster wall or it may extend a little beyond the face as shown in Figure 2.

From the above description, it can be seen that I have provided a very novel and useful means for securing outlet boxes in openings, and one that will save time in installing, and after installation will be rigidly secured in an opening, yet it may be readily removed.

I am aware that numerous changes will, in view of the teachings of my invention as herein illustrated, suggest themselves to those skilled in the art to which my invention appertains, and I reserve the right to any such changes as fall within the scope of the claim hereto appended.

I claim:

Supporting means for an electrical outlet box, said support being adapted to be inserted through a hole in a wall or ceiling centrally between two spaced joists thereof comprising, in combination, a pair of anchoring arms, each arm member being constructed of a flat rigid material and made slightly longer than half the distance between the joists, the outer end of each of the arms being twisted at right angles to the remaining portion of the arm having two or more pointed spurs on the outer twisted ends to engage the said joists, the opposite ends of the arms having apertures therethrough to receive a pivot pin, an L shaped bracket having an opening in the outer end of one of the legs thereof of substantially the same size as the aperture in the said anchoring arms, said leg being positioned between the apertured ends of the said anchoring arms, a pin frictionally connecting the two apertured ends of the anchoring arms with the leg of the bracket, the other leg of the bracket adapted to extend across the outer rear surface of the outlet box, a pair of apertures within said other leg for receiving bolts for securing the outlet box to the said second mentioned bracket leg, the length of the said first mentioned leg and the depth of the outlet box being substantially that of the distance from the outer surface of the ceiling to the point of contact of the anchoring arms with the joists.

References Cited in the file of this patent

UNITED STATES PATENTS

| | | |
|---|---|---|
| 274,672 | Thomason | Mar. 27, 1883 |
| 1,326,959 | Paine | Jan. 6, 1920 |
| 1,396,279 | Paine | Nov. 8, 1921 |
| 1,850,616 | Barnett | Mar. 22, 1932 |
| 1,927,515 | Eastman | Sept. 19, 1933 |
| 2,233,334 | Austin | Feb. 25, 1941 |
| 2,380,155 | Divine | July 10, 1945 |
| 2,423,757 | Dedge | July 8, 1947 |